Jan. 3, 1928.                                              1,654,596
C. T. OLSON
BEARING CONSTRUCTION
Filed Nov. 17, 1924
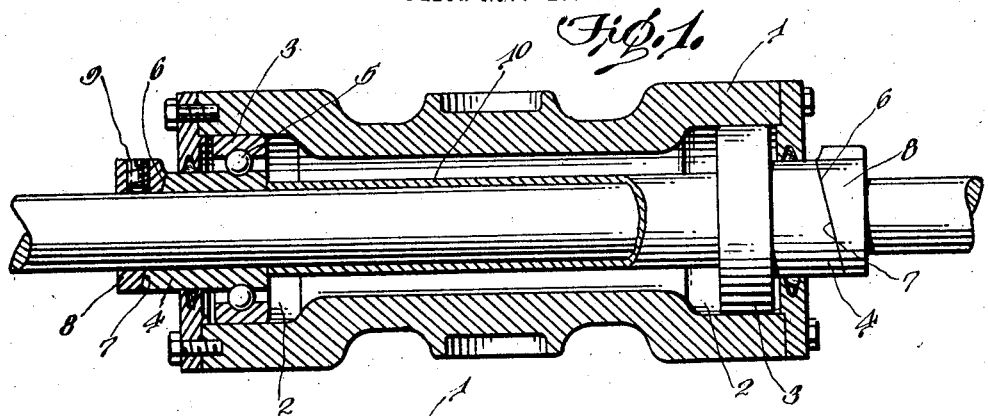
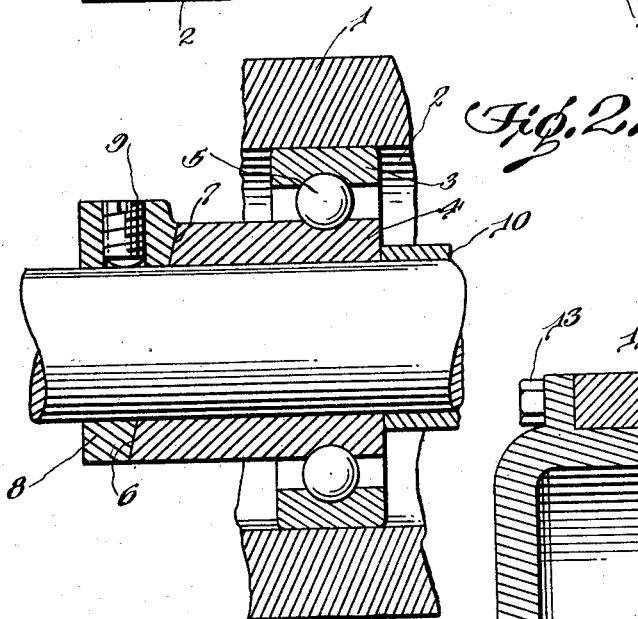
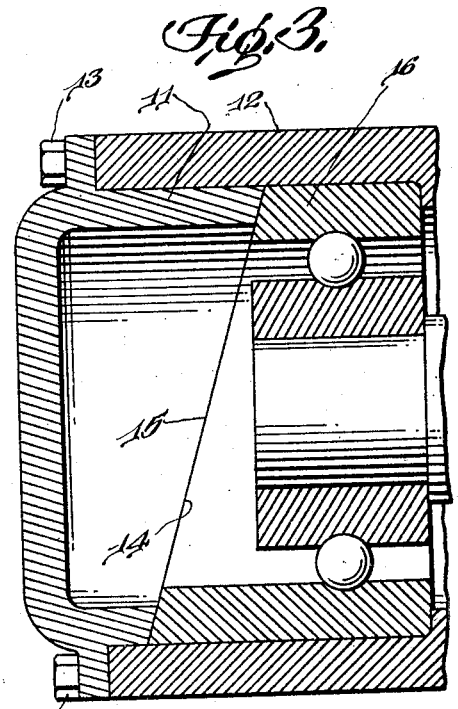
C. T. Olson
INVENTOR
BY Victor J. Evans
ATTORNEY Patented Jan. 3, 1928.

1,654,596

UNITED STATES PATENT OFFICE.

CLARENCE T. OLSON, OF CHICAGO, ILLINOIS.

BEARING CONSTRUCTION.

Application filed November 17, 1924. Serial No. 750,411.

This invention relates to an anti-friction bearing construction and more particularly to means for locking the bearing construction in position and has for its primary object the construction of a locking device that may be easily set and will automatically operate to lock the bearing.

An object of the invention is the use of locking means automatically operating in proportion to the strain to which it is subject thereby providing a positive lock.

An object of the invention is the construction of a locking device that may be capable of locking either ring of the bearing effectively.

A feature of my invention is the novel manner of associating the various parts to limit the longitudinal movement of the bearing in combination with means for locking one of the members of the bearing against circumferential movement.

With these and other objects in view the invention will be better understood from the following detailed description taken in connection with the accompanying drawings wherein:

Fig. 1 is a sectional view of one form of the bearing construction.

Fig. 2 is an enlarged sectional view.

Fig. 3 is an enlarged sectional view of another of the many constructions of my invention.

Again referring to the drawings illustrating two of the many constructions of my invention and more particularly to Figs. 1 and 2 the numeral 1 designates any suitable well-known construction of housing in which is mounted the anti-friction bearings 2. At this point I wish to call attention to the fact that various other forms of housing and bearings may be used in carrying out my invention and the bearing shown includes the outer ring 3, inner ring 4 and anti-friction elements 5 between the rings.

As stated in the object of my invention either ring may be locked against turning movement. In Figs. 1 and 2 I have shown the inner ring locked against relative movement and in this particular case the inner ring has a bevelled surface 6 for acting with the bevelled surface 7 of my improved locking element illustrated as a set collar 8 locked to the shaft by the set screw 9. The sleeve 10 on the shaft limits the longitudinal movement of the bearing on the shaft and by setting the collar on the shaft in proper position any tendency of the shaft to turn will move the collar in a direction to create a cam action between the bevelled surfaces, thereby effectively locking the inner ring to the shaft.

In Fig. 3 I have shown means for locking the outer ring comprising a locking element shown in the form of a plate bolted to the housing 12 as indicated at 13. This plate has a bevelled surface 14 coacting with the bevelled surface 15 on the outer ring 16.

It is, of course, to be understood that various parts may be constructed in various other ways and associated in other relations. The main object of my invention is the provision of means of effectively locking a portion of the bearing for effectively holding the same in position and in such a way that this action is automatic and in proportion to the strain and therefore I do not desire to be limited in any manner except as set forth in the following claims.

Having thus described my invention, what I claim is:

1. In a bearing construction, a shaft, anti-friction bearings associated with the shaft and including inner and outer ring members, the inner ring being loose on the shaft and having one end beveled, a collar secured on the shaft adjacent the beveled end of the inner ring and having its inner face beveled for contact with the beveled end of said inner ring, and a member carried by the shaft and limiting movement of the inner ring longitudinally of the shaft in a direction away from said collar.

2. In a bearing construction, a shaft, anti-friction bearings associated with the shaft and including inner and outer ring members, the inner ring being loose on the shaft and having one end beveled, a collar secured on the shaft adjacent the beveled end of the inner ring and having its inner face beveled for contact with the beveled end of said inner ring, and a member carried by the shaft and held against movement in a direction away from the collar, said member contacting with the other end of said inner ring and coacting with the collar during rotation of the shaft to lock the inner ring to the shaft for rotation therewith.

3. In a bearing construction, a shaft, anti-friction bearings associated with the shaft and including inner and outer ring members, means limiting movement of the bearings in one direction, the inner ring of the bearings being provided at the end thereof opposite to said limiting means with a bevelled surface, and a collar secured on the shaft and having a bevelled surface contacting with the bevelled surface of said inner ring whereby the inner ring is urged toward the limiting means and locked against rotation relative to the shaft upon rotation of the latter, the bevelled surfaces of the inner ring and the collar compensating for expansion and contraction of the shaft.

4. In a bearing construction, a housing, anti-friction bearing structures mounted in the housing for sliding movement therein and including inner and outer rings, a shaft mounted through the inner rings, a spacing member mounted on the shaft between the bearing structures, the inner rings and the spacing member being free from the shaft, said inner rings being provided at their outer ends with bevelled faces, and collars secured on the shaft, and having bevelled faces contacting with the bevelled faces of the inner rings and coacting therewith during rotation of the shaft to urge the inner rings toward the spacing member.

In testimony whereof I affix my signature.

CLARENCE T. OLSON.